No. 646,521. P. K. DEDERICK. Patented Apr. 3, 1900.
BALE OF COTTON OR FIBROUS MATERIAL.
(Application filed Oct. 10, 1899.)
(No Model.)
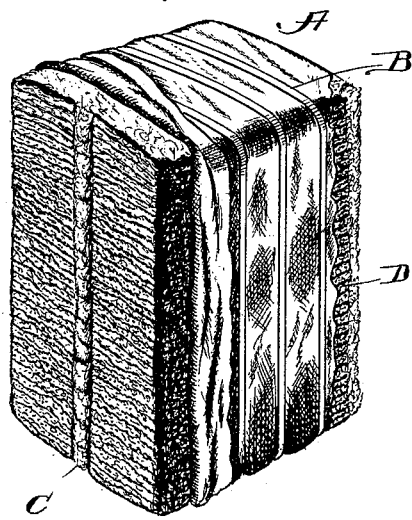
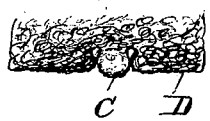
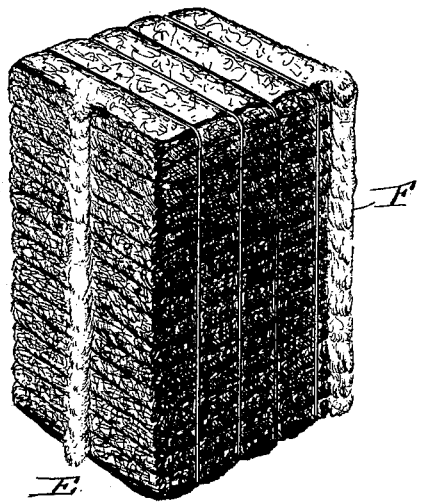
Witnesses
J. M. Fowler Jr.
Alexander Stewart
Inventor
Peter K. Dederick,
By Church & Church
His Attorneys.
THE NORRIS PETERS CO., PHOTO-LITHO., WASHINGTON, D. C.

UNITED STATES PATENT OFFICE.

PETER K. DEDERICK, OF LOUDONVILLE, NEW YORK.

BALE OF COTTON OR FIBROUS MATERIAL.

SPECIFICATION forming part of Letters Patent No. 646,521, dated April 3, 1900.

Original application filed May 22, 1899, Serial No. 717,861. Divided and this application filed October 10, 1899. Serial No. 733,170. (No model.)

*To all whom it may concern:*

Be it known that I, PETER K. DEDERICK, a citizen of the United States, and a resident of Loudonville, in the county of Albany and State of New York, have invented certain new and useful Improvements in Bales of Cotton or Fibrous Material; and I do hereby declare the following to be a full, clear, and exact description of the same, reference being had to the accompanying drawings, forming a part of this specification, and to the letters of reference marked thereon.

This invention relates to improvements in bales of cotton or other fibrous or lint material, the object being to provide a bale from which samples of the material may be readily taken regardless of the compactness of the bale and which samples will when desired represent all parts of the bale from one end to the other.

Heretofore in sampling bales of cotton or other material it has been customary to bore into them with an instrument and with it pull out tufts of the cotton or other material; but this method of sampling is difficult at best and with solid bales, especially those made in accordance with more recent improvements in the art of baling, quite impractical. Moreover, the old method of sampling is slow and imperfect, as the samples obtained represent but one portion of the bale. By the present improvements, however, these difficulties are overcome and a sample may be instantly obtained without the use of instruments and representing any or every part of the bale. This is accomplished by forming the bale with a ridge or tuft of loosely-pressed material preferably extending in the direction in which the bale was pressed, so as to be formed in part from each section or charge.

Bales may be made in accordance with the invention by any ordinary baling-press properly modified by providing an expansion-space for the purpose, as set forth in my application, dated May 22, 1899, Serial No. 717,861, of which case this application is a division.

Referring to the accompanying drawings, Figure 1 is a perspective view of a bale of cotton embodying my present improvements. Fig. 2 is a similar view showing a bale with slightly-different forms of sampling-ridges. Fig. 3 is a sectional view showing the sampling-tuft in a recess.

The bales A shown in the drawings are represented as formed of sections of material pressed together and bound by bands or other confining means, such as indicated at B.

In Fig. 1 sampling-ridges C and D extend across the bale in the direction in which the material was pressed or transversely of the sections, such sampling-ridges being left loose or relatively loose in the baling operation, or so as to expand and become loose or relatively loose when the bale is discharged from the press, and in this the preferred form of bale the sampling-ridges occupy a recess or cavity, as it were, in the harder body of the bale and are formed in part by part of each of the sections constituting the bale. The sampling-ridge C is located in one of the faces of the bale, and D is located at one of the corners; but it will be understood that the particular location of the sampling-ridge is not material, and I do not wish to be limited with respect thereto.

In Fig. 2 the sampling-ridges E on one face and F on one corner are outside of the general surface of the bale and constitute, as it were, projections thereon; but in each and every instance and as shown in the drawings they are formed of relatively-loose material tufted out from the material from which the body of the bale is formed.

With a bale embodying a relatively-loose sampling-section, such as described, samples of the material may be pulled off from any portion of the bale, giving an opportunity to obtain correct samples of the material and preventing any possibility of deception by placing inferior material in the interior of the bale.

Bales may be made in accordance with this invention by any preferred or ordinary process—as, for instance, by the continuous process or by a single compression, as in an ordinary box-press—and hence I do not wish to be limited with respect to the characteristics of the body of the bale.

Having thus described my said invention, what I claim as new, and desire to secure by Letters Patent of the United States, is—

1. A solidly-pressed and bound bale of cotton or other similar material, having its exterior surfaces hard and firm excepting at comparatively-small areas which are left unpressed to afford loose sampling-sections; substantially as described.

2. A bale of cotton or similar material formed with a sampling-tuft located in a recess in the bale; as set forth.

3. A bale of cotton or similar material formed with a loosely-expanded sampling-tuft extending from one end to the other of the bale in the direction in which the material was compressed; substantially as described.

4. A bale of cotton or similar material formed with a loosely-expanded sampling-tuft located in a recess and extending from one end to the other of the bale in the direction in which the material was compressed.

PETER K. DEDERICK.

Witnesses:
F. X. CLEMENT,
W. A. SKINKLE.